US009715788B2

(12) United States Patent
Bennett

(10) Patent No.: US 9,715,788 B2
(45) Date of Patent: *Jul. 25, 2017

(54) METHOD OF GAMING, A GAMING SYSTEM AND A GAME CONTROLLER

(71) Applicant: Aristocrat Technologies Australia Pty Limited, North Ryde, NSW (AU)

(72) Inventor: Nicholas Luke Bennett, Manly Vale (AU)

(73) Assignee: Aristocrat Technologies Australia Pty Limited (AU)

(*) Notice: Subject to any disclaimer, the term of this patent is extended or adjusted under 35 U.S.C. 154(b) by 206 days.

This patent is subject to a terminal disclaimer.

(21) Appl. No.: 14/132,958

(22) Filed: Dec. 18, 2013

(65) Prior Publication Data

US 2014/0106863 A1 Apr. 17, 2014

Related U.S. Application Data

(63) Continuation of application No. 12/427,538, filed on Apr. 21, 2009, now Pat. No. 8,616,966.

(30) Foreign Application Priority Data

Apr. 22, 2008 (AU) ................................ 2008901998

(51) Int. Cl.
*A63F 13/45* (2014.01)
*G07F 17/32* (2006.01)

(52) U.S. Cl.
CPC ................................ *G07F 17/3272* (2013.01)

(58) Field of Classification Search
CPC ... G07F 17/32; G07F 17/3272; G07F 17/3283
USPC ............................................................ 463/28
See application file for complete search history.

(56) References Cited

U.S. PATENT DOCUMENTS

| | | | | |
|---|---|---|---|---|
| 5,836,586 | A | 11/1998 | Marks et al. | |
| 5,855,516 | A | 1/1999 | Eiba | |
| 6,682,073 | B2 | 1/2004 | Bryant et al. | |
| 6,793,575 | B2 | 9/2004 | Brown et al. | |
| 6,939,229 | B2 | 9/2005 | McClintic | |
| 7,231,327 | B1 | 6/2007 | Beverina et al. | |
| 2002/0042294 | A1 | 4/2002 | Pau et al. | |
| 2002/0055422 | A1 | 5/2002 | Airmet et al. | |
| 2002/0087222 | A1 | 7/2002 | Jira et al. | |
| 2003/0119573 | A1* | 6/2003 | McClintic | G07F 17/32 463/16 |
| 2003/0125100 | A1 | 7/2003 | Cannon | |

(Continued)

FOREIGN PATENT DOCUMENTS

| | | |
|---|---|---|
| AU | 2007237214 | 12/2007 |
| CA | 2403035 | 3/2003 |

(Continued)

*Primary Examiner* — Allen Chan
(74) *Attorney, Agent, or Firm* — McAndrews, Held & Malloy, Ltd.

(57) ABSTRACT

A method of gaming with multiple players comprising: determining a set of eligible multi-player game players; assigning each eligible multi-player game player a number of multi-player game turns depending on a wager amount; and conducting the multi-player game turns with the eligible multi-player game players and determining multi-player game turn outcomes until a multi-player game end condition occurs.

12 Claims, 10 Drawing Sheets

(56) References Cited

U.S. PATENT DOCUMENTS

| | | | | |
|---|---|---|---|---|
| 2004/0102238 | A1 | 5/2004 | Taylor | |
| 2005/0059473 | A1 | 3/2005 | Gomez et al. | |
| 2005/0181856 | A1 | 8/2005 | Cannon et al. | |
| 2005/0215300 | A1* | 9/2005 | Oliveras | G07F 17/32 463/13 |
| 2006/0009281 | A1 | 1/2006 | Stronach | |
| 2006/0019744 | A1 | 1/2006 | Roemer | |
| 2006/0030959 | A1 | 2/2006 | Duhamel | |
| 2006/0048132 | A1 | 3/2006 | Chen et al. | |
| 2006/0148547 | A1 | 7/2006 | Montgomery et al. | |
| 2006/0287072 | A1* | 12/2006 | Walker | G07F 17/32 463/25 |
| 2006/0287102 | A1 | 12/2006 | White et al. | |
| 2007/0060346 | A1 | 3/2007 | Edwards | |
| 2007/0167210 | A1 | 7/2007 | Kelly et al. | |
| 2007/0213116 | A1 | 9/2007 | Crawford et al. | |
| 2007/0270221 | A1 | 11/2007 | Park et al. | |
| 2008/0096622 | A1* | 4/2008 | Terada | A63F 13/10 463/2 |
| 2008/0108401 | A1* | 5/2008 | Baerlocher | G07F 17/3272 463/12 |
| 2008/0254883 | A1 | 10/2008 | Patel et al. | |
| 2009/0111560 | A1* | 4/2009 | Davis | G07F 17/32 463/20 |
| 2010/0287011 | A1 | 11/2010 | Muchkaev | |

FOREIGN PATENT DOCUMENTS

| | | |
|---|---|---|
| CA | 2604063 | 11/2006 |
| CA | 2553543 | 4/2007 |
| CA | 2527416 | 5/2007 |
| CA | 2548924 | 11/2007 |
| CA | 2588164 | 11/2007 |
| GB | 2402461 | 12/2004 |
| GB | 2405813 | 3/2005 |
| GB | 2406290 | 3/2005 |
| JP | 8024384 | 1/1996 |
| WO | 0204080 | 1/2002 |
| WO | 0227676 | 4/2002 |
| WO | 02094399 | 11/2002 |
| WO | 2006127802 | 11/2006 |
| WO | 2007100273 | 9/2007 |

* cited by examiner

METHOD OF GAMING, A GAMING SYSTEM AND A GAME CONTROLLER

RELATED APPLICATIONS

This application is a continuation of U.S. application Ser. No. 12/427,538, filed on Apr. 21, 2009, which claims priority to Australian Provisional Patent Application No. 2008901998, having a filing date of Apr. 22, 2008. The above-identified applications are hereby incorporated herein by reference in their entirety.

FEDERALLY SPONSORED RESEARCH OR DEVELOPMENT

[Not Applicable]

[MICROFICHE/COPYRIGHT REFERENCE]

[Not Applicable]

BACKGROUND OF THE INVENTION

The present invention relates to a method of gaming, a gaming system and a game controller.

Gaming systems are known comprising a game controller arranged to randomly display several symbols from a predetermined set of symbols and to determine a game outcome such as a game win based on the displayed symbols. Such gaming systems may commonly be implemented as a stepper machine provided with reels with each reel carrying several symbols of the set, or a video machine with selected symbols are displayed in virtual reels on a video display.

Commonly feature game rounds can be offered on a trigger event, which may the award of a particular prize or a random occurrence, where a game of a different character is played than the regular, or "base" game. In multiplayer sites, players may be arranged in a common area where they can view a common display. The base game may be a single player game on respective single player gaming machines, the feature game may involve one or more of the players in playing game on the common display.

There is a need for alternative or enhanced gaming systems and methods to add to player enjoyment during multi-player games.

BRIEF SUMMARY OF THE INVENTION

According to a first aspect of the invention there is provided a method of gaming with multiple players comprising:

determining a set of eligible multi-player game players;

assigning each eligible multi-player game player a number of multi-player game turns depending on a wager amount; and conducting the multi-player game turns with the eligible multi-player game players and determining multi-player game turn outcomes until a multi-player game end condition occurs.

According to a second aspect of the invention there is provided a method of gaming with multiple players comprising single player game rounds and a multi-player game initiated as a feature game in response to a multi-player game trigger event, wherein the multi-player game comprises the steps of:

determining a set of eligible multi-player game players;

assigning each eligible multi-player game player a number of multi-player game turns;

conducting the multi-player game turns with the eligible multi-player game players until a multi-player game end condition occurs wherein during the multi-player game turns the eligible multi-player game players compete to win one or more prizes and at least one eligible multi-player game player is given an option to select a tool symbol having associated actions from a tool symbol set; and determining multi-player game turn outcomes as influenced by actions of the tool symbols.

In one embodiment the wager amount is an amount wagered in the single player game. In an embodiment the amount wagered in the single player game is an amount bet for each win line in each the single player game rounds.

In one embodiment wherein the associated actions for at least one of the tool symbols selected by the eligible multi-player game player affects aspects of the multi-player game turns of other eligible multi-player game players.

In one embodiment the tool symbol set is a limited pooled resource of tool symbols available also to other eligible multi-player game players.

In one embodiment the step of competing to win a prize includes trying to find the location of a prize symbol hidden on the multi-player game display and the actions of some of the tool symbols include assisting the player holding the tool to find the location. In an embodiment there is one hidden prize symbol.

In one embodiment the multi-player game end condition occurs when all the assigned multi-player game turns are used. In another embodiment the multi-player game end condition occurs when all the hidden prizes are found.

In one embodiment the eligible multi-player game players play the multi-player game at least in part by touching symbols on the multi-player game display.

According to a third aspect of the invention there is provided a gaming system for implementing a multi-player game, comprising a multi-player game display and a multi-player game controller comprising:

a multi-player game turn assigner for determining a set of eligible multi-player game players and assigning each eligible multi-player game player a number of multi-player game turns depending on a wager amount;

a multi-player game turn conductor for conducting the multi-player game turns with the eligible multi-player game players until a multi-player game end condition occurs; and a multi-player game turn outcome determiner for determining multi-player game turn outcomes.

According to a fourth aspect of the invention there is provided a gaming system for implementing single player games and a multiple player game, comprising single player displays for displaying single player game rounds, a multi-player game display for displaying a multi-player game initiated as a feature game in response to a multi-player game trigger event, and a multi-player game controller comprising:

a multi-player game turn assigner for determining a set of eligible multi-player game players and assigning each eligible multi-player game player a number of multi-player game turns;

a multi-player game turn conductor for conducting the multi-player game turns with the eligible multi-player game players until a multi-player game end condition occurs, wherein the eligible multi-player game players compete to win one or more prizes and at least one eligible multi-player game player is given an option to select a tool symbol having associated actions from a tool symbol set; and a multi-player game turn outcome determiner for determining multi-player game turn outcomes as influenced by actions of the tool symbols.

According to a fifth aspect of the invention there is provided a game controller for implementing a multi-player game displayed at least in part on a multi-player game display, having a multi-player game controller comprising:

a multi-player game turn assigner for determining a set of eligible multi-player game players and assigning each eligible multi-player game player a number of multi-player game turns depending on a wager amount;

a multi-player game turn conductor for conducting the multi-player game turns with the eligible multi-player game players until a multi-player game end condition occurs; and a multi-player game turn outcome determiner for determining multi-player game turn outcomes.

According to a sixth aspect of the invention there is provided a game controller for implementing single player games and a multiple player game, comprising single player game round controllers for controlling single player game rounds displayed on single player displays, a multi-player game controller for controlling a multi-player game displayed at least in part on a multi-player display initiated as a feature game in response to a multi-player game trigger event, and a multi-player game controller comprising:

a multi-player game turn assigner for determining a set of eligible multi-player game players and assigning each eligible multi-player game player a number of multi-player game turns;

a multi-player game turn conductor for conducting the multi-player game turns with the eligible multi-player game players until a multi-player game end condition occurs, wherein the eligible multi-player game players compete to win one or more prizes and at least one eligible multi-player game player is given an option to select a tool symbol having associated actions from a tool symbol set; and a multi-player game turn outcome determiner for determining multi-player game turn outcomes as influenced by actions of the tool symbols.

According to a seventh aspect of the invention there is provided computer program code when executed by a computer causes the computer to implement any of the embodiments of the method of gaming of the first or second aspects of the invention.

According to a eighth aspect of the invention there is provided a computer readable medium comprising the program code of the seventh aspect of the invention.

According to a ninth aspect of the invention there is provided a data signal comprising the computer program code of the seventh aspect of the invention.

In a tenth aspect, the invention extends to transmitting the program code.

BRIEF DESCRIPTION OF SEVERAL VIEWS OF THE DRAWINGS

Illustrative embodiments of the invention are described in relation to the accompanying drawings in which.

DETAILED DESCRIPTION OF THE INVENTION

Figure 1:
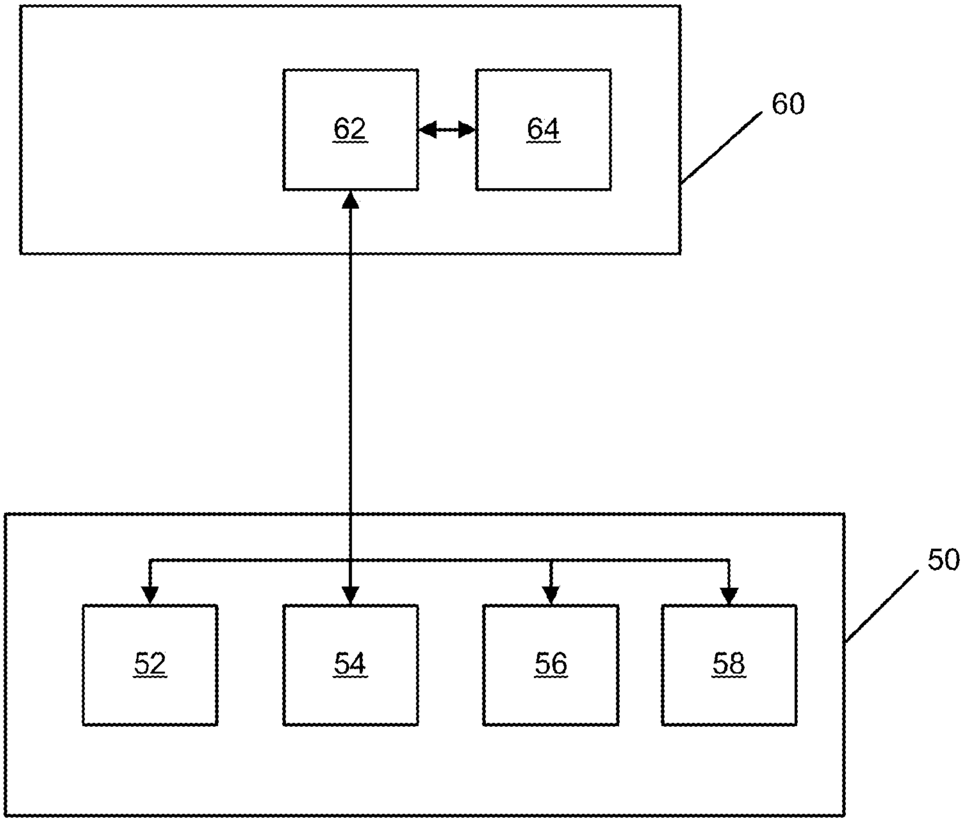
FIG. 1 is a block diagram of the core components of a gaming system.

Referring to the drawings, there is shown a gaming system for a multiplayer game where in one aspect each player's number of turns in the multiplayer game is affected by the amount they bet in a single player game and in another aspect the players use tools which affect the outcome. Below both aspects are combined in a single embodiment but persons skilled will appreciate that the aspects could be provided independently of one another.

Exemplary Single Player Gaming Systems

Figure 9:
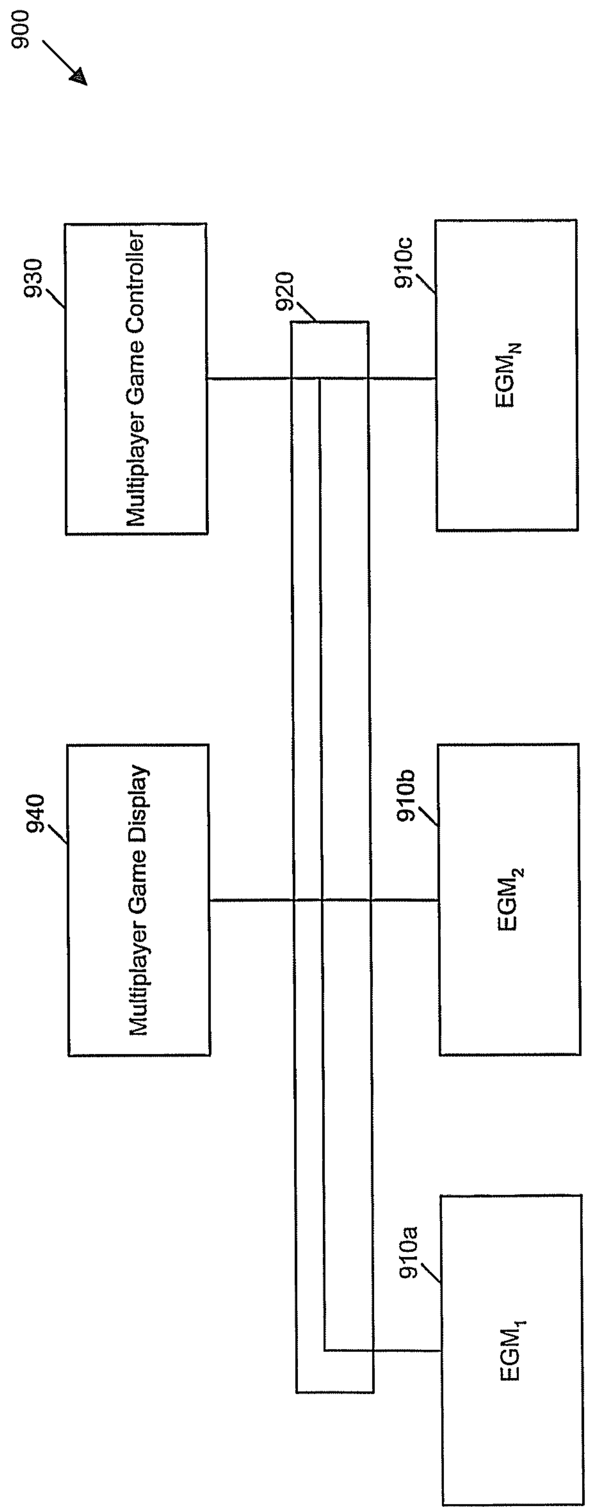
FIG. 9 is a block diagram of another multi-player gaming system.

Multiple player games such as described in the current embodiments may employ single player gaming systems as described in more detail below in communication with a multi-player game controller to control the multiple player game. In one embodiment multiplayer play is displayed on the individual displays of a plurality of single player gaming systems such that the individual displays form the multi-player game display. In some embodiments such as illustrated in FIG. 9, a multiplayer game display 940 displays the multiplayer game as carried out by multiplayer game controller 930 which is in data communication with a plurality of gaming machines 910 over network 920 and also networked to display 940. In such embodiments, the multi-player game may be displayed on both the common display 940 and the individual displays of gaming machines 910. The individual displays may have associated touch screens.

Figure 10:
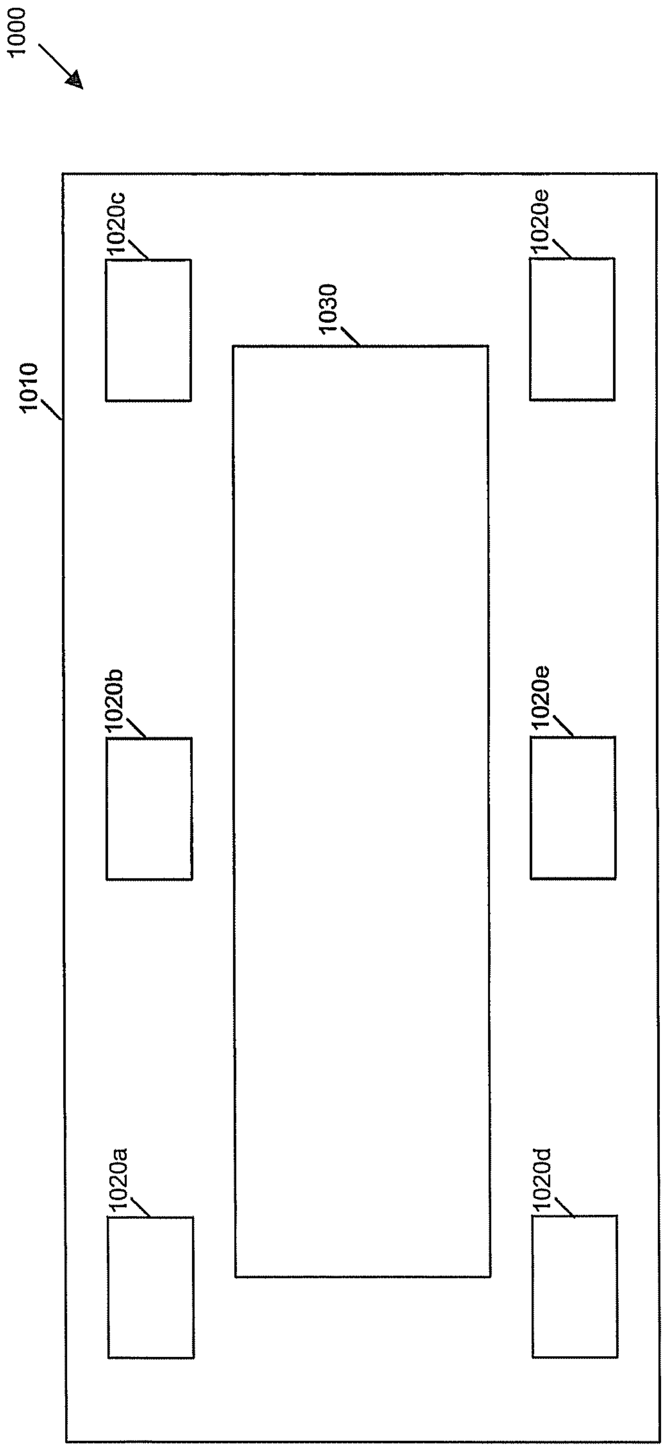
FIG. 10 is a block diagram of a further multi-player gaming system.

In some embodiments, a gaming system has a display which also has a touch screen input, accessible to all eligible multi-game players in a common location. One such embodiment is shown in FIG. 10 where a plurality of single player stations 1020*a*-1020*f* are positioned facing each other, on the upper surface of a table 1010 with the multi-player display with touch screen 1030 located in the middle of the table 1010. Persons skilled in the art will appreciate that other configurations can be employed and in particular, that table 1010, could be round, oval, hexagonal, octagonal, etc.

In embodiments employing a single player gaming system, the gaming system may take a number of different forms. In a first form of the single player gaming system of the invention, a stand alone gaming machine is provided wherein all or most components required for implementing the game are present in a player operable gaming machine.

In a second form of a single player gaming system, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system comprises several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions and play the game.

Components of the player interface may vary from embodiment to embodiment but will typically include a credit mechanism 52 to enable a player to input credits and receive payouts, one or more displays 54, a game play mechanism 56 comprising one or more input devices that enable a player to input game play instructions (e.g. to place bets), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
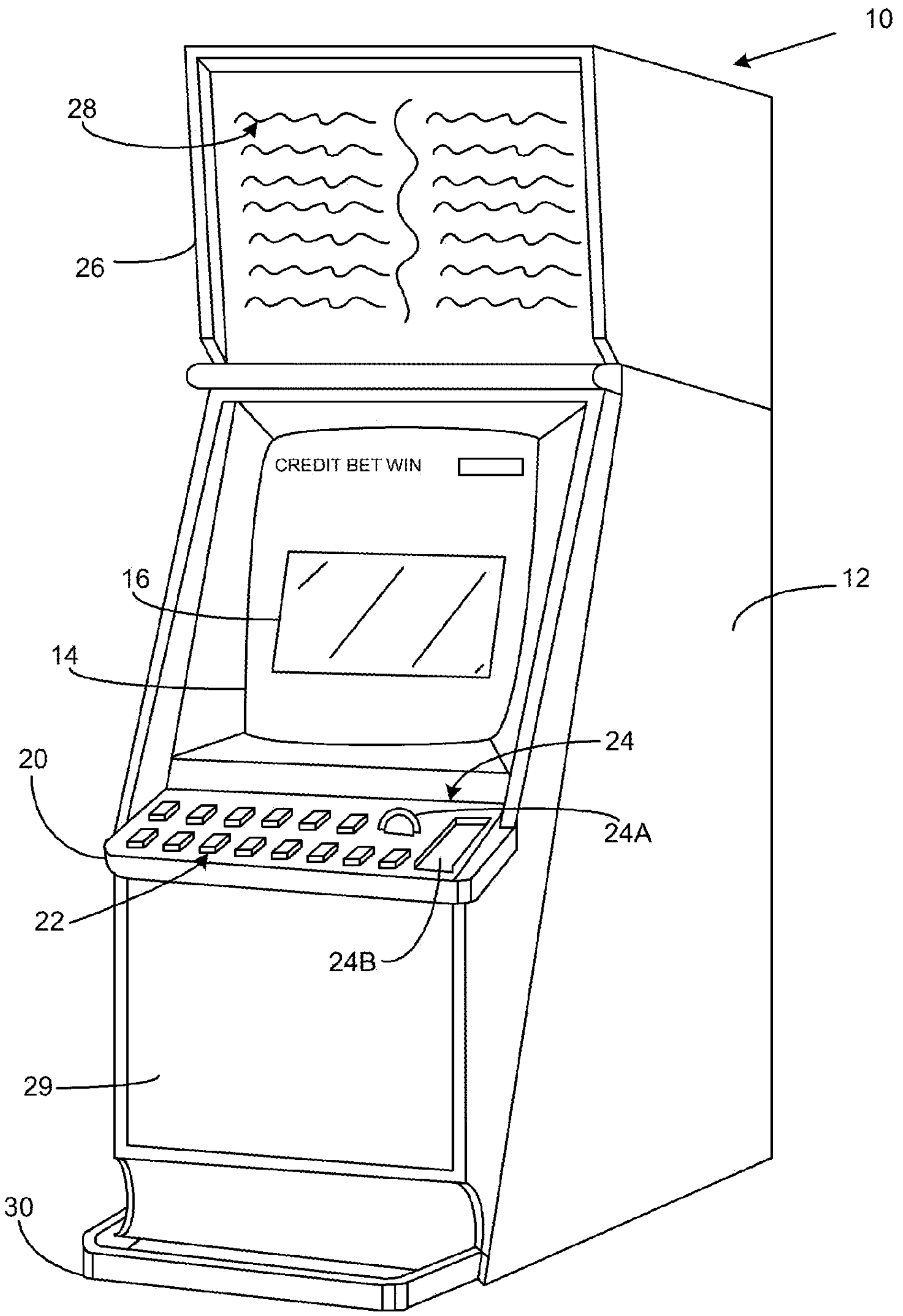
FIG. 2 is a perspective view of a stand alone single player gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module (not shown) having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
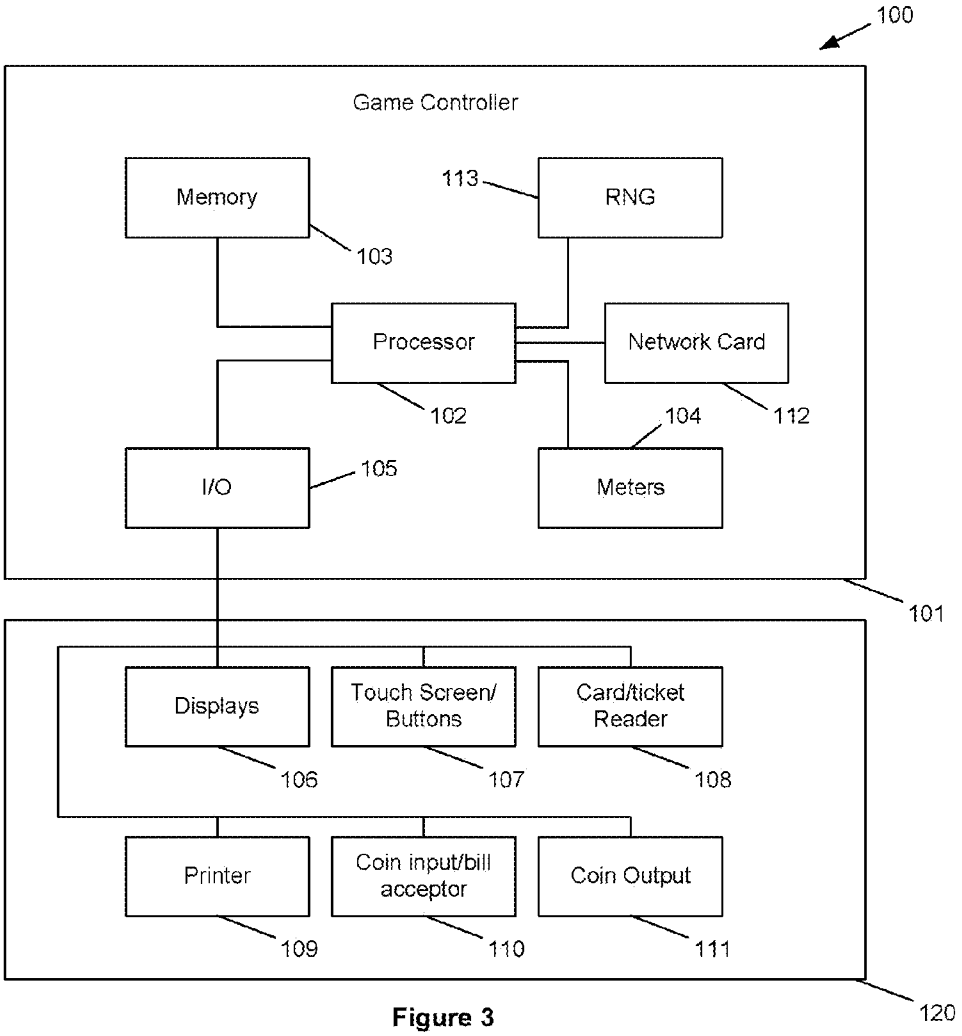
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 comprise one or more displays 106, a touch screen and/or buttons 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
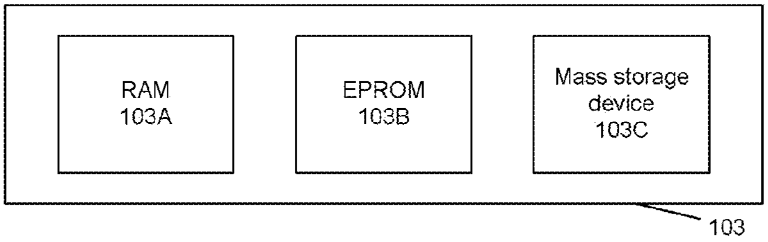
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 1038 or elsewhere.

It is also possible for the operative components of the gaming machine 100 to be distributed, for example input/output devices 106,107,108,109,110,111 to be provided remotely from the game controller 101.

Figure 5:
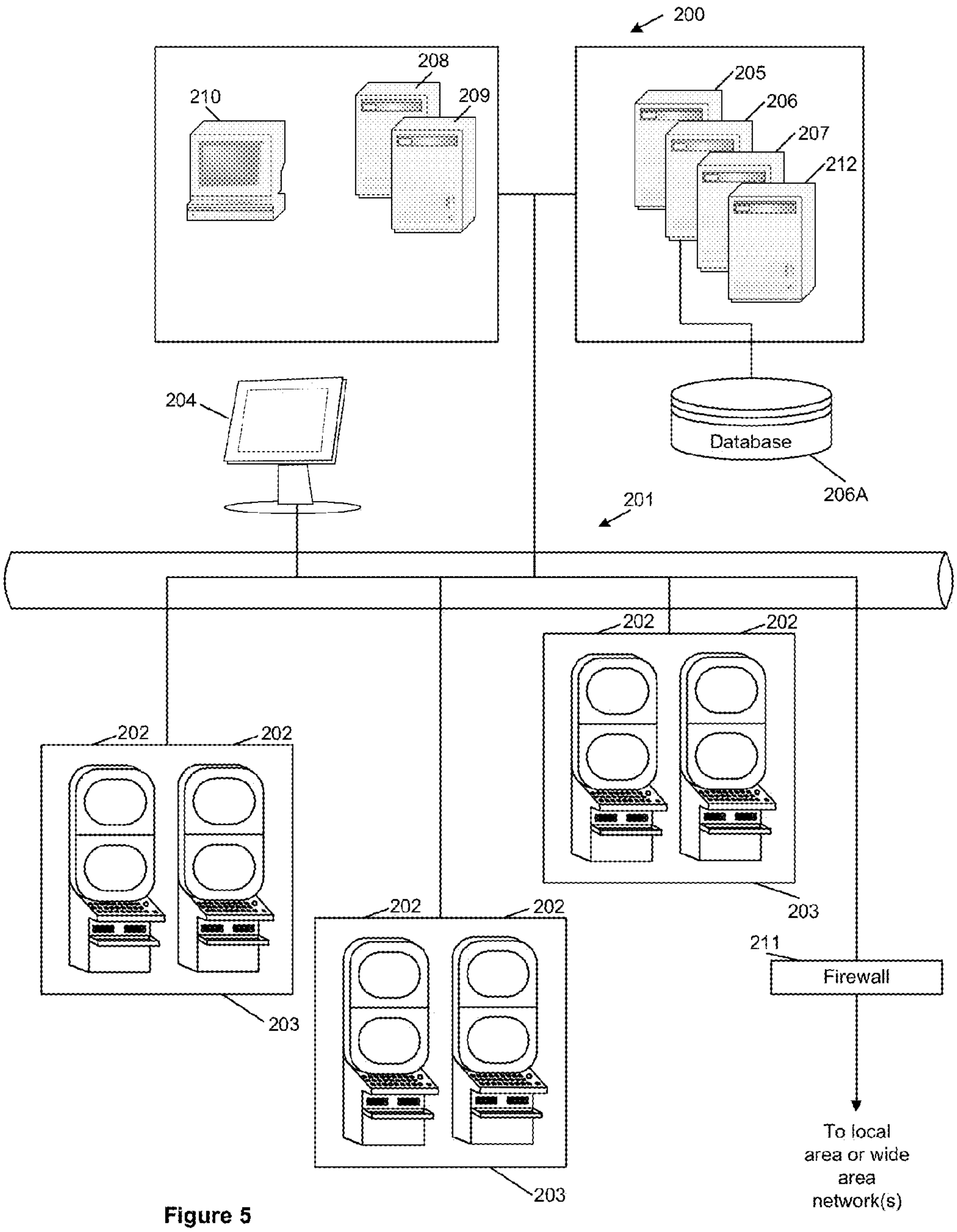
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, (e.g. they may provide the multiplayer game display 940 of FIG. 9) and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of games servers could be provided to run different games or a single game server may run a plurality of different games as required by the terminals.

Further Description of Exemplary Game Controller

Figure 6:
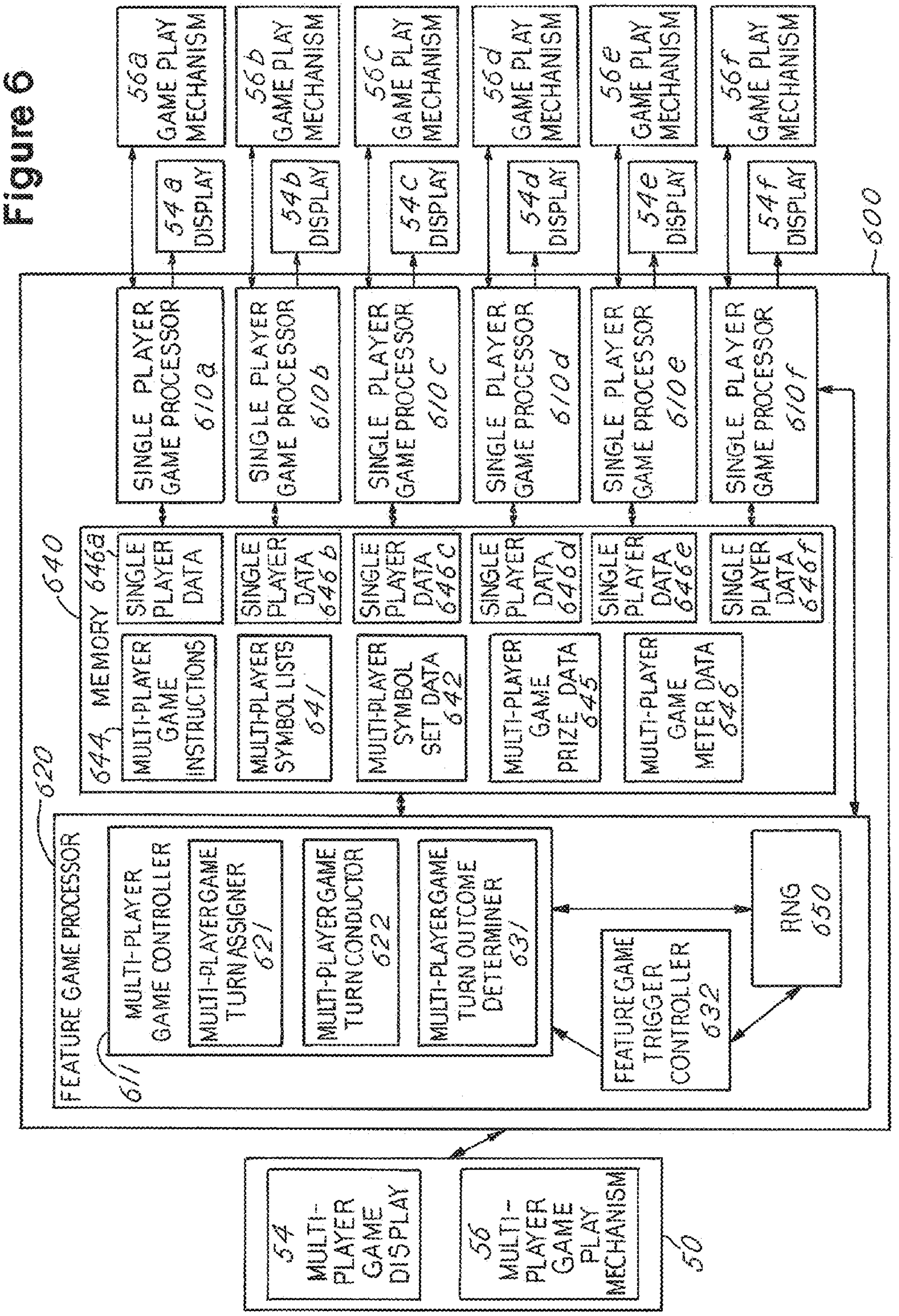
FIG. 6 is a further block diagram of the multiplayer gaming system of the current invention.

The game controller 600 of one embodiment is shown in more detail in FIG. 6. The game controller 600 incorporates a plurality of single player game processors shown as 610*a* to 601*f* (not restricted to any particular number) and a multi-player game processor 620 which implements in software multi-player game turn assigner 621, multi-player game turn conductor 622 and multi-player game outcome determiner 631 operably interconnected with random number generator 650 and multi-player game trigger controller 632. Connected to the single player game processors 610*a* to 610*f* and multi-player game processor 62 is a memory 640 incorporating single player data 646*a* to 646*f*, multi-player game instructions 644, multi-player symbol lists 641, multi-player symbol set data 642, multi-player prize data 645, and multi-player meter data 646. Thus, game controller 600 provides both the single player and multi-player game controller in this embodiment. Persons skilled in the art will appreciate that the gaming system can also be provided by a plurality of game controller, such as individual game controllers of the single player game in data communication with a multi-player game controller.

The game controller 600 is operably connected also to single player displays 54*a* to 54*f* and corresponding single player game play mechanisms 56*a* to 56*f*, as well as a multi-player game display 540 and multi-player game play mechanism 560 for the operation of the multi-player game.

Persons skilled in the art will appreciate that one or more of these components could be provided in other ways, for example by a dedicated circuit.

In an example of a game to which the invention is applied, 6 players play single player game rounds using single player displays 54*a* to 54*f* and single player game play mechanism 56*a* to 56*f*. On a multi-player game trigger event, which could be a particular prize on by one of the players or a random event provided by random number generator 650 or any other trigger, multi-player game trigger controller 632 activates multi-player game controller 611 to pause the single player game rounds and initiate the multi-player game. multi-player game turn assigner 621 first determines which of the players is eligible to participate, which may be by virtue of having previously paid a participation fee, and then assigns to each eligible player a total number of turns in the multi-player game, depending on the size of the bet the player has been making per win line in the single player game rounds. Multi-player game turn assigner 621 then selects a player for the first turn, which may be a player whose win triggered the multi-player game. Multi-player game turn conductor 622 then conducts the game turns, offering each player on the player's respective single player display 54*a* to 54*f* either to choose a tool for later use in another game round, or to compete to find the location of a hidden symbol on multi-player game display 54. The player then plays the turn, and if the player chooses to compete, the player uses multi-player game play mechanism 56 which may be a touch screen interface or other input device to use tools previously chosen from feature symbol lists 641 (such as a shovel to dig) and to set a location in which to look for the prize symbol (also part of multi-player symbol lists 641). Persons skilled in the art will appreciate that while the multi-player game play mechanism 56 is shown as separate to the individual game player mechanisms 56*a*-56*f*, the individual game play mechanisms may in some embodiments (such as shown in FIG. 9) act as the multi-player game play mechanism. Similar considerations apply to displays 54, 54*a*-54*f*. Note also that the individual displays 54*a*-54*f* may include plural displays (e.g. with one in a top box 26 as described above) such that a separate display is used for the individual and multi-player game.

Multi-player game outcome determiner 631 then determines the outcome, which is whether or not the prize symbol was uncovered, and any other changes to the state of the multi-player game, updating multi-player game prize data 645 and multi-player game meter data 646. Multi-player game turn assigner 621 specifies the next player to have a turn. When either the multi-player game turn assigner 621 reports that there are no players left with turns, or multi-player game outcome determiner 631 reports that all prizes are awarded, multi-player game controller 611 terminates and control passes back to the single player game processes for single player game rounds, until the next trigger event.

Figure 7A:
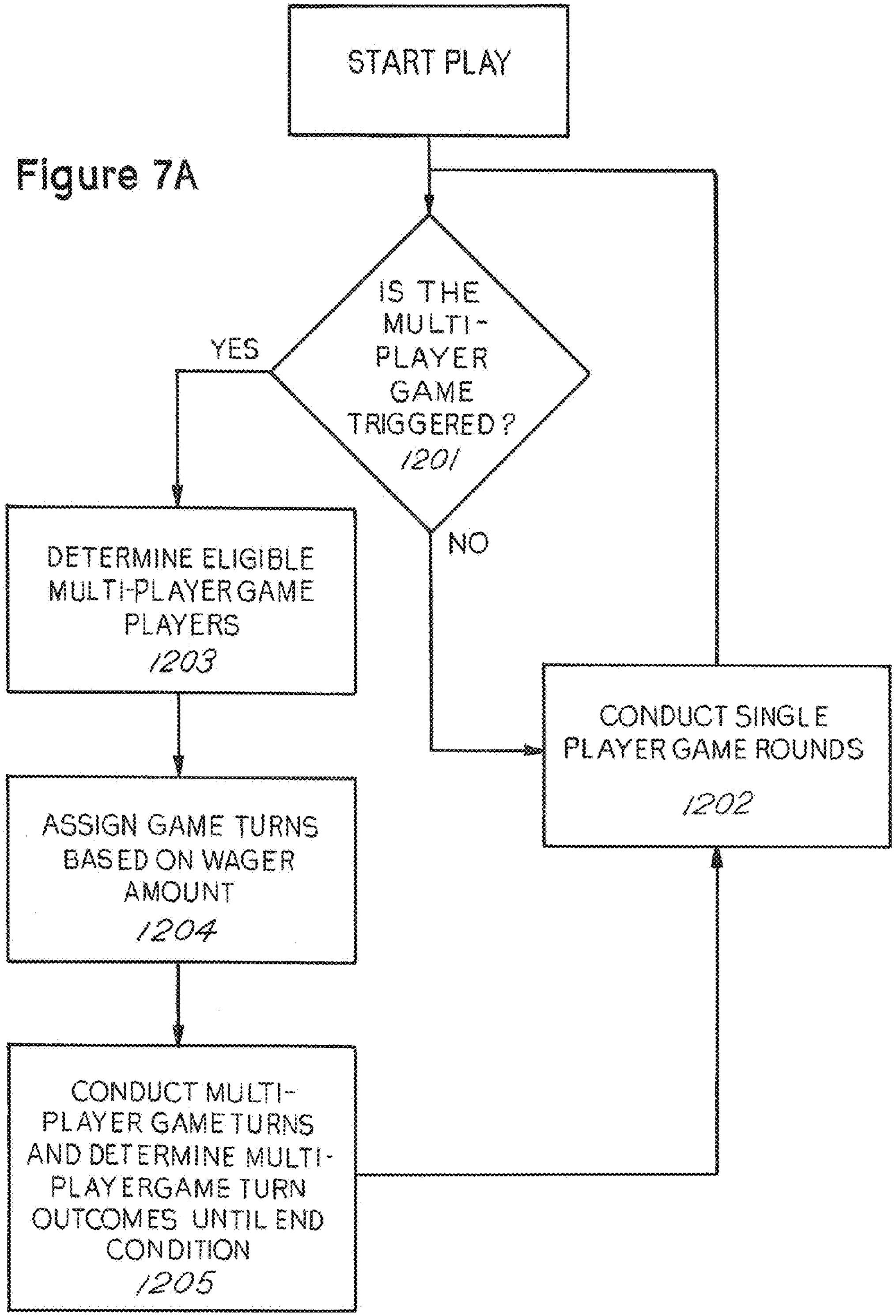
FIGS. 7A and 7B show flow diagrams for the method of an embodiment of the invention.
Figure 7B:
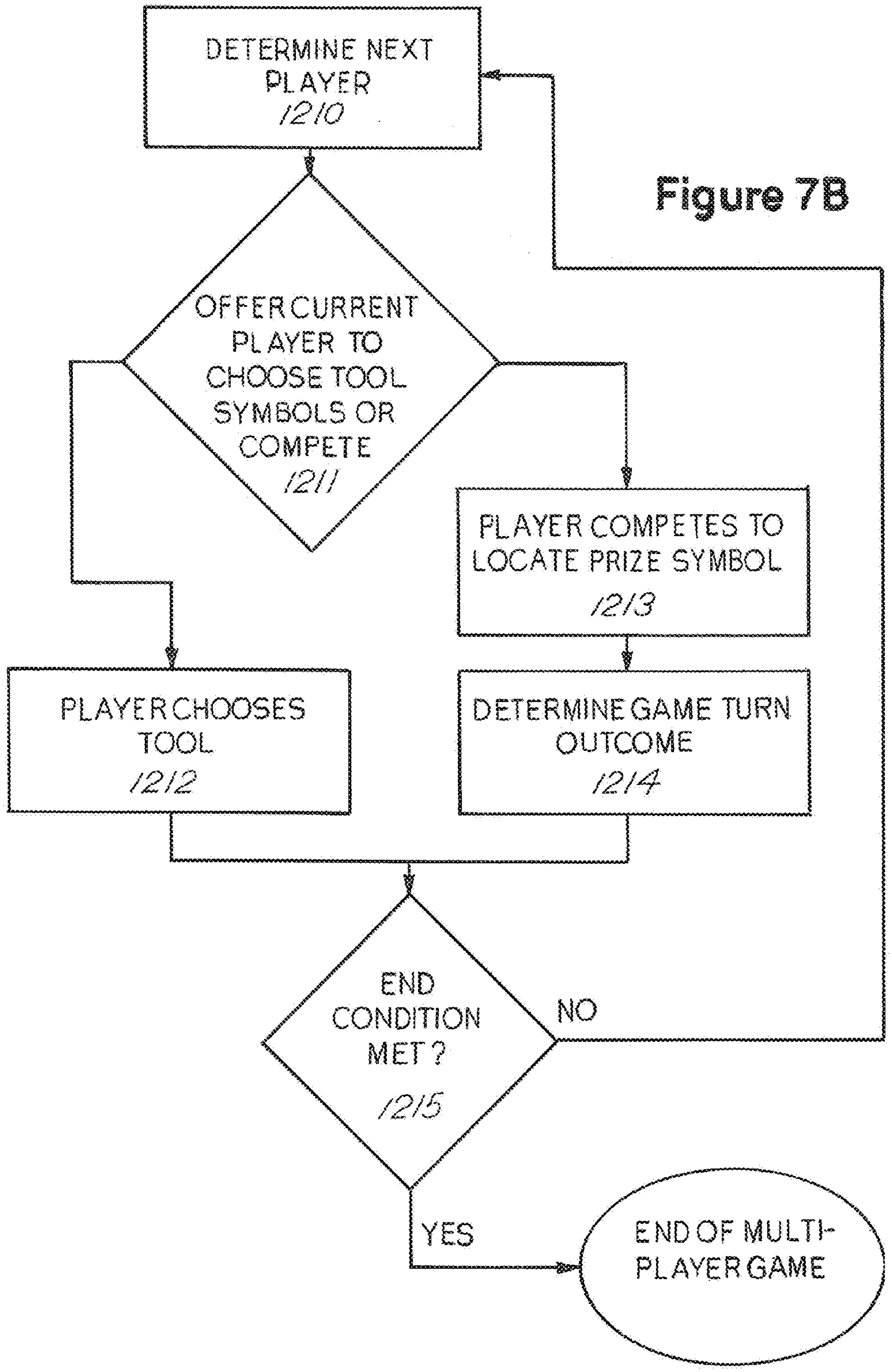

Now referring to FIGS. 7A and 7B, a flow diagram for an embodiment of the invention is shown. Referring first to FIG. 7A, in step 1201, during single player game rounds, multi-player game trigger controller monitors in step 1201 whether a multi-player game has been triggered. If not, the single player game rounds (step 1202) are allowed to continue. If so, the single player game rounds stop and multi-player game controller 611 and its sub-controllers as described above determine eligible players in step 1203, assign each eligible players a number of multi-player game turns depending on their wager amount in step 1204 and in step 1205 conduct multi-player game turns for each eligible player, determining multi-player game turn outcomes, until an multi-player game end condition is met. Referring to FIG. 7B, steps included in the conduct of the multi-player game, step 1205 are shown. First multi-player game turn assigner in step 1210 specifies which player is next to have a turn, and decrements a counter in multi-player game meter data 646 representing number of turns left for that player. Multi-player game turn conductor 622 in step 1211 then displays an offer on the single game display to the current player, to select a tool or compete to find the prize symbol. If the player choose to select a tool, in step 1212 the tool is selected, which may involve a decrement of game credits. If the player chooses otherwise, in step 1213 the player chooses to compete, interacting with the multi-player game display 54 and multi-player game play mechanism 56 to try to locate the prize symbol, using any tools previously obtained. The multi-player game turn outcome is then determined in step 1214, which may be a prize of game credits or money. Multi-player game controller 611 then determines whether the end condition is met, as described above.

EXAMPLE 1

A detailed example of an embodiment of the invention will now be described. In this example there is a table with 10 single player player terminals including displays and game play mechanisms arranged around the table and a large central LCD touch screen lying flat on the surface of the table as the feature game display, able to be touched by all the players A brief overview of game play is as follows:

- Players play the single player game round independently on their terminals until one terminal triggers the "Sunken Treasure" feature;
- The prize being played, or "dived" for in the feature game or "dive" is randomly selected in the range $100-$500;
- The eligible players are specified as those wagering the "tournament ante" bet.
- Each eligible player is assigned a number of dives equal to their bet per line;
- Eligible players take turns clockwise starting with the terminal that triggered the feature;
- On each player's turn the player may first choose to purchase one of 5 tools at varying costs to help them with their dive;
  - The "flashlight" will double whatever prize amount is revealed from that dive;
  - The "shovel" will triple whatever prize amount is revealed from that dive;
  - The "camera" will allow the player to reveal the prizes from 2 different locations before choosing which one to take. The disadvantage they need to consider is that subsequent players will have the advantage of seeing what is hidden at one location that is available to them;
  - The "bag" allows the player to forfeit their current turn to purchase 3 more turns (i.e. 2 additional turns). The disadvantage they need to consider is that another player may reveal the large prize during the round where their turn is forfeited.
  - The "gloves" allow the player to swap their revealed prize for the prize revealed by one of the next two subsequent players.
- The player may only purchase one tool per turn and can only use each tool once per feature. Hence they need to strategically decide which tool will be of the most benefit to them at that particular turn.
- The player whose turn it is touches one of 100 locations on the central screen to reveal either a symbol for the large prize or a consolation prize. Any benefits from tools they purchased will be applied as described above.
- Eligible players continue their turns clockwise around the table to select locations and reveal prizes until each eligible player has used all of the dives available to them.
- When the multi-player game ends the terminals return to independent play of the single player base game.

The 10 single game play terminals have physical buttons associated with them, including a large PLAY button and also 5 standard buttons below each terminal.

The gaming system is able to run single player game software at each of the terminals individually but with two-way communications that is capable of detecting play at each of the terminals and upon meeting the multi-player game trigger condition forcing all terminals, or a subset, to play the common multi-player game that involves interaction with the central LCD display. There is touch screen input at the LCD display as well as the terminals.

There is a single player game available at each of the terminals with a fixed denomination, bet per line & number of paylines. The details of the single player game are unimportant. The single player game also includes a "tournament feature ante bet" for eligibility for the multi-player game, which is an extra 10 credits per line on top of the base game bet if the player wishes to be eligible for the multi-player game.

When a multi-player game is triggered terminals will only be eligible to participate if:

- The single player game that is CURRENTLY being played included the tournament feature ante bet, or
- No game is currently being played but the LAST game played was completed within the last 20 seconds AND included the tournament feature ante bet.

Whenever a single player game is initiated at a terminal and includes the tournament feature ante bet, the following process occurs to check for multi-player game trigger event and eligibility:

1. Select a random number between 1 and 100
2. If the selected number is 1 then:
   a) Notify the central controller that a tournament feature multi-player game has been triggered
   b) Play a single player game according to the single player bet
   c) Display the tournament multi-player game banner and disable further single player game play
   d) Notify the central controller that the terminal is ready to commence the tournament multi-player game feature and also the amount that was bet on the single player game that just completed
3. Otherwise if the selected number is not 1 (i.e. not a trigger) then:
   a) Play a single player game according to the single player bet
   b) Check whether a tournament multi-player game feature has been triggered by another terminal since the start of the game (and keep checking until either another game is initiated or a total of 20 seconds has elapsed since the last game completed whichever is the sooner)
   c) If a multi-player game tournament has been triggered then:
      i) Display the multi-player game tournament banner and disable further single player game play
      ii) Notify the multi-player game controller that the terminal is ready to commence the tournament feature and also the amount that was bet on the game that just completed If the multi-player game controller receives more than one multi-player game trigger notification before the independent play of the terminals is disabled, then the subsequent triggers are buffered along with the bet amounts from each of the terminals. As soon as the first multi-player game completes the next one will initiate before independent single player game play at the terminals resumes.

Games that do not include the tournament feature ante bet are disabled during multi-player game play. Hence the multi-player game controller notifies all terminals when a multi-player game tournament feature is about to commence. If a terminal is in idle mode when it receives this notification then it disables further game play and displays a banner over the game screen with the message “TOURNAMENT FEATURE CURRENTLY IN PLAY”. If a terminal is currently in single player game play mode playing a game that does not include the tournament ante bet when it receives the notification then it must wait for the current single player game to complete before disabling further play and displaying the same message banner.

When the multi-player game controller receives notification that a multi-player game tournament feature has been triggered it then waits until it has received from each of the 10 terminals one of the following:

1. A bet on a single player game that does not include the tournament feature ante bet or
2. Notification that the terminal is ready to commence the multi-player game feature or
3. Indication that the terminal is not in game play mode continuing for more than 20 seconds Once it has received one of the above from all of the terminals it sends out a message to all terminals that the multi-player game tournament feature is about to commence.

Only the terminals that have notified the central controller that they are ready to commence the multi-player game will take part in the current multi-player game tournament feature event. Game play on other terminals will be disabled while the multi-player game is in operation (see above).

Next the multi-player game controller needs to determine through the multi-player game turn assigner the number of feature dives that each eligible terminal has. Each of the eligible terminals will have notified the controller of the size of the bet on the last single player game when they notified the controller that they are ready to start the multi-player game. These bets determine the number of feature dives that the terminals will have. Each bet needs to be divided by the (maximum number of pay lines+tournament ante bet) to get the bet per line and this will be the number of feature dives that the terminal will have. For example if it costs the player 20 paylines plus 10 credits to buy tournament eligibility then if the total bet on the game being played when the feature was triggered was 60 credits then the bet per line must have been 2 and therefore the applicable terminal will get 2 dives in the feature event.

When all eligible terminals are ready to commence the feature the tournament animation and sounds commence at the same time on both the multi-player game display and the single player displays on the terminals. The multi-player game display then shows an underwater scene displaying a number of different features that the players can dive to (for example rocks, shells, shipwreck, coral, fish etc). There are at least enough places to dive to cater for every terminal being eligible at maximum bet so for example for 10 terminals with a maximum of 10 credits bet per line there need to be at least 100 different items or places displayed in the underwater scene.

A random selection is made by the multi-player game controller from the multi-player game prize data 645. The selected amount (between $100 and $500) is added to any amount remaining from the previous multi-player game event and this is the prize in the current multi-player game. The prize will appear as a message “THIS FEATURE DIVING FOR $ZZZ” displayed at the top and bottom of the multi-player game display (i.e. with text facing in opposite directions so that it can be read from both sides of the multi-player display when looked at from above).

Figure 8:
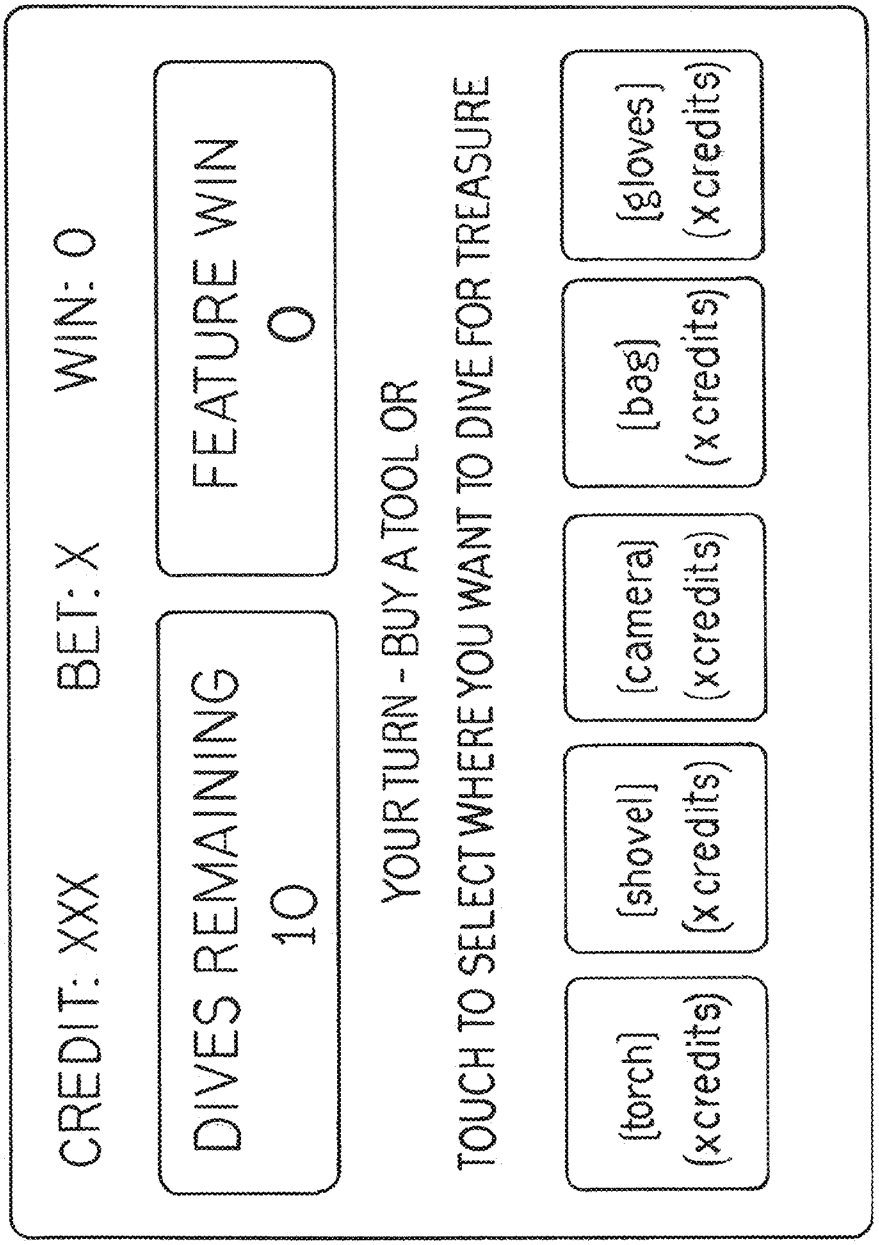
FIG. 8 is a single player display as viewed during the multiple player game of an embodiment of the invention.

On the single player displays of the eligible multi-player game players is displayed a multi-player screen with two meters at the top, as shown in FIG. 8. One meter shows the number of dives remaining for that terminal (i.e. DIVES REMAINING: 10 for a terminal that bet 10 credits per line on the game that triggered the feature). The other meter is a special multi-player game win meter that starts at 0. The centre of the terminal screens displays 5 tool icons (see Tools Feature description below).

The terminal that triggered the multi-player game tournament feature also displays a flashing banner that says “YOUR TURN—BUY A TOOL OR TOUCH TO SELECT WHERE YOU WANT TO LOOK FOR TREASURE”. On the top and bottom of the multi-player game display (i.e. so that it can be read from each side of the display) the message “PLAYER #X’S TURN TO DIVE” is displayed where X is the number of the terminal that triggered the feature.

When the multi-player game display is touched at one of the treasure locations a banner appears over the location with text written the right way up to be read from the relevant terminal. The message "PLAYER NUMBER X TOUCH AGAIN TO CONFIRM" will be on the banner to ensure that the right player made the selection. If more than 10 seconds pass without the banner being touched OR another location on the screen is touched then the selection will be cancelled. However if the banner is touched to confirm the choice then a random selection firstly made to determine which prize will be hidden at the location. There is always a fixed number of consolation prizes plus the large prize to be distributed and as each one is selected for a location it is removed from the list so that it cannot be selected again (i.e. it will be mathematically the same as distributing all of the prizes at the start of the feature but without the need to have each location pre-determined from the start). For example, if there are 100 locations on the feature screen then there is a consolation prize table with 99 prizes plus 1 large prize to be selected from. The consolation prize table may also include negative events such as non-wins that reduce the number of dives remaining and could be represented as a shark attack etc. If a prize is won then an animation will reveal the amount won at the relevant location as "PLAYER #X $YY" where YY is the amount. An exciting win tune and animation is played if it is the large multi-player game prize amount otherwise just a standard small-win tune. The message remains displayed over the chosen location for the duration of the multi-player game so that players know that they cannot choose that location again.

Next the amount won appears on the special multi-player game win meter on the triggering terminal and the DIVES REMAINING meter on that terminal decrements. The next eligible terminal in clockwise sequence then display the "YOUR TURN . . . " message and the whole process repeats with the new terminal. Once each eligible terminal has had a turn the control moves clockwise to the next eligible terminal that still has at least one dive remaining and the process repeats. This continues until all eligible terminals have used up all of their dives. If the large prize is not found during the feature then it is added to the amount that is randomly selected for the next multi-player game tournament feature event.

When all of the dives have finished the remaining prize amounts that were not found are distributed amongst the locations that were not selected and an animation reveals them all together in a dull/greyed out state so that the players can see what the un-won prizes were. The multi-player game completion animation then occurs and the multi-player game wins are transferred to the standard win meters of the terminals in the standard way. If another multi-player game trigger event has been buffered then a new tournament will commence and the whole multi-player game process will repeat with the same eligible terminals. Otherwise the multi-player game controller notifies all terminals the multi-player game feature event has completed and standard single player game play resumes on all terminals.

At the start of every turn in the multi-player game the relevant player has the option to purchase a tool to help them during their dive. There are 5 different tools and the effects of each are explained below. The tools are displayed on each of the terminals during the multi-player game tournament feature event are initially be dull/greyed out. When it is the applicable terminal's turn to dive the tools that are available to the player to purchase are highlighted. A tool is NOT available to purchase if one of the following is true:

- The player does not have enough credit to purchase it, or
- The player has already used that tool on a previous turn during the same feature event, or
- It is not possible for the particular tool function to apply to this turn The actions and effects of each type of tool are described below:

Flashlight

If the player chooses to purchase the flashlight it will cost them x credits (refer to the maths for actual cost), but whatever win they reveal from the current turn will be doubled. Hence the player hopes to make more than the cost of the tool to make it worth while.

Shovel

If the player chooses to purchase the shovel it will cost them x credits (refer to the maths for actual cost), but whatever win they reveal from the current turn will be tripled. Hence the player hopes to make more than the cost of the tool to make it worth while.

Camera

If the player chooses to purchase the camera it will cost them x credits (refer to the maths for actual cost), but they will be allowed to look in 2 prize locations and will be awarded the larger of the two prizes. Hence the player is buying themselves an extra chance to try and find the large prize, however they need to take into account the fact that they are giving other players the advantage of knowing what is in one of the locations available to them.

Note: The camera will NOT be available if there is only one location left for the player to choose.

Bag

If the player chooses to purchase the bag it will cost them x credits (refer to the maths for actual cost) to forfeit their current turn in order to get 3 turns added to the number of dives they have remaining. Hence they run the risk that someone else may get the large prize during the round for which their turn has been forfeited, BUT they will have 2 additional attempts to find the large prize after that.

Note: The bag will NOT be available if there may not be enough locations to complete the feature—for example if all 10 terminals are playing the feature and bet 10 credits per line prior to commencing the feature then all 100 locations will be needed to complete the feature.

Gloves

If the player chooses to purchase the gloves it will cost them x credits (refer to the maths for actual cost), but they will be allowed to swap the prize they reveal with one of the 2 next players prizes. That is, after the next two player turns are complete the central monitor will determine which of the 3 prizes is the largest and will give that prize to the first player swapping the first player's prize for it. Strategically, the two following players would be best off not applying tools to their turns because it will increase the risk of them losing their prize. Note: The gloves will NOT be available if there are less than 2 turns remaining before the feature will complete.

It will be appreciated from the above that an advantageous aspect of the gaming system is that a player's particular use of tools may affect the prospects of another player.

Persons skilled in the art will appreciate that the method of the embodiment could be embodied in program code. The program code could be supplied in a number of ways, for example on a computer readable medium, such as a disc or a memory (for example, that could replace part of memory 103) or as a data signal (for example, by transmitting it from a server).

Persons skilled in the art will also appreciate that many variations may be made to the invention without departing from the scope of the invention, in particular persons skilled in the art will appreciate that features of specific embodiments or examples may be combined to form further embodiments.

In the claims which follow and in the preceding description of the invention, except where the context requires otherwise due to express language or necessary implication, the word “comprise” or variations such as “comprises” or “comprising” is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The invention claimed is:

1. A method of using a gaming system to play a single player base game and multi-player feature game, the gaming system having a credit input mechanism configured to establish player credit balances and a game controller, the method comprising:

establishing player credit balances via the credit input mechanism;

conducting via the game controller single player base games using player credit balances;

initiating a multi-player feature game, the multi-player feature game comprising the steps of:

(i) determining via the game controller a set of players eligible to play the multi-player feature game, the set of eligible players being selected from the players currently playing the single player base game;

(ii) assigning via the game controller each eligible multi-player feature game player a number of multi-player feature game turns; and (iii) conducting via the game controller the multi-player feature game turns with the eligible multi-player game players, wherein the multi-player feature game turns are executed by the eligible players in a successive manner so that a multi-player feature game turn of a first eligible player is not executed concurrently with a multi-player feature game turn of a second eligible player, and (iv) determining multi-player feature game turn outcomes until a multi-player feature game end condition occurs.

2. A method as claimed in claim 1, wherein the number of multi-player game turns assigned to each eligible multi-player is based upon a predetermined criteria.

3. A method as claimed in claim 2, wherein the number of multi-player game turns assigned to an eligible player is based upon a wager amount placed by the player.

4. A method as claimed in claim 1, further comprising initiating the multi-player game in response to a triggering event.

5. A method as claimed in claim 4, wherein the number of multi-player game turns assigned to an eligible player is based upon a wager amount placed by the player in a single player game prior to the triggering event.

6. A method as claimed in claim 1, further comprising determining via the game controller multi-player feature game turn outcomes until a multi-player feature game end condition occurs.

7. A gaming system for implementing a single player base game and a multi-player feature game, comprising:

a credit input mechanism configured to establish player credit balances; and a game controller configured to:

conduct single player base games using player credit balances;

conduct a multiplayer game, the multiplayer game comprising the steps of:

(i) determining a set of players eligible to play the multi-player feature game, the set of eligible players being selected from the players currently playing the single player base game;

(ii) assigning each eligible multi-player feature game player a number of multi-player feature game turns; and (iii) conducting the multi-player feature game turns with the eligible multi-player game players, wherein the multi-player feature game turns are executed by the eligible players in a successive manner so that a multi-player feature game turn of a first eligible player is not executed concurrently with a multi-player feature game turn of a second eligible player.

8. A gaming system as claimed in claim 7, wherein the number of multi-player game turns assigned to an eligible multi-player is based upon a predetermined criteria.

9. A gaming system as claimed in claim 8, wherein predetermined condition comprises a wager amount placed by the player.

10. A gaming system as claimed in claim 7, wherein the game controller is configured to initiate multi-player game in response to a triggering event.

11. A gaming system as claimed in claim 7, wherein the number of multi-player game turns assigned to an eligible player is based upon a wager amount placed by the player in a single player game prior to the triggering event.

12. A gaming system as claimed in claim 7, wherein the game controller is configured to determine multi-player feature game turn outcomes until a multi-player feature game end condition occurs.

* * * * *